US012700647B2

(12) United States Patent
Rhee et al.

(10) Patent No.: US 12,700,647 B2
(45) Date of Patent: Aug. 4, 2026

(54) BATTERY PACK

(71) Applicant: SK On Co., Ltd., Seoul (KR)

(72) Inventors: Seo Roh Rhee, Daejeon (KR); Ji Eun Kang, Daejeon (KR); Yang Kyu Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 642 days.

(21) Appl. No.: 18/082,327

(22) Filed: Dec. 15, 2022

(65) Prior Publication Data

US 2023/0231277 A1 Jul. 20, 2023

(30) Foreign Application Priority Data

Jan. 14, 2022 (KR) ........................ 10-2022-0005825

(51) Int. Cl.
H01M 50/503 (2021.01)
H01M 50/507 (2021.01)
H01M 50/522 (2021.01)

(52) U.S. Cl.
CPC ....... H01M 50/503 (2021.01); H01M 50/507 (2021.01); H01M 50/522 (2021.01)

(58) Field of Classification Search
CPC .......... H01M 50/20–211; H01M 50/218–224; H01M 50/233–236; H01M 50/24; H01M 50/249; H01M 50/258; H01M 50/30; H01M 50/35–358; H01M 50/50–503; H01M 50/507; H01M 50/514; H01M 50/521–529; H01M 50/572–574; H01M 50/581–583

See application file for complete search history.

(56) References Cited

U.S. PATENT DOCUMENTS

| | | | |
|---|---|---|---|
| 12,431,570 B2 | 9/2025 | Jo et al. | |
| 2018/0358600 A1* | 12/2018 | Nakayama | .......... H01M 50/522 |
| 2019/0372083 A1* | 12/2019 | Ryu | .................... H01M 50/105 |
| 2020/0153123 A1 | 5/2020 | Duensbier et al. | |
| 2020/0321589 A1* | 10/2020 | Watahiki | ............. H01M 50/583 |

(Continued)

FOREIGN PATENT DOCUMENTS

| | | |
|---|---|---|
| EP | 2698847 A1 | 2/2014 |
| EP | 3907818 A1 | 11/2021 |

(Continued)

OTHER PUBLICATIONS

Machine translation of Yanagihara, JP 2018-110082. Originally available Jul. 12, 2018. (Year: 2018).*

(Continued)

*Primary Examiner* — Nicole M. Buie-Hatcher
*Assistant Examiner* — Jacob Buchanan
(74) *Attorney, Agent, or Firm* — IP & T GROUP LLP

(57) ABSTRACT

A battery pack includes a pack housing, and at least one battery assembly accommodated in the pack housing. The battery assembly includes a first cell stack and a second cell stack in each of which a plurality of battery cells are stacked, and a busbar assembly electrically connecting the plurality of battery cells to each other. The busbar assembly includes a first coupling portion coupled to the first cell stack, a second coupling portion coupled to the second cell stack, and a connection portion connecting the first coupling portion and the second coupling portion to each other.

17 Claims, 7 Drawing Sheets

(56)     References Cited

U.S. PATENT DOCUMENTS

| 2021/0218114 A1 | 7/2021 | Chida et al. | |
| 2022/0209365 A1* | 6/2022 | Rhee | H01M 50/581 |
| 2023/0099554 A1* | 3/2023 | Jo | H01M 50/507 |
| | | | 429/433 |

FOREIGN PATENT DOCUMENTS

| JP | 2018110082 A | * | 7/2018 | | Y02E 60/10 |
| KR | 10-1463196 B1 | | 11/2014 | | |
| KR | 10-2019-0112580 A | | 10/2019 | | |
| KR | 10-2022-0001228 A | | 1/2022 | | |
| WO | 2019/244402 A1 | | 12/2019 | | |
| WO | 2021/221309 A1 | | 11/2021 | | |
| WO | WO-2022004997 A1 | * | 1/2022 | | H01M 10/653 |

OTHER PUBLICATIONS

Extended European Search Report Issued by the EPO for Application No. 22214254.9, dated Jun. 12, 2023.
Office Action for Korean Patent Application No. 10-2022-0005825 issued by the Korean Patent Office on Feb. 13, 2026.

* cited by examiner

A

BATTERY PACK

CROSS-REFERENCE TO RELATED APPLICATION(S)

This application claims benefit of priority to Korean Patent Application No. 10-2022-0005825 filed on Jan. 14, 2022 in the Korean Intellectual Property Office, the disclosure of which is incorporated herein by reference in its entirety.

BACKGROUND

1. Field

The present disclosure relates generally to secondary battery technology and, in particular, to an improved battery pack and an improved manufacturing method thereof.

2. Description of Related Art

Unlike primary batteries, secondary batteries are chargeable and dischargeable, and thus are applicable to devices within various fields such as digital cameras, mobile phones, notebook computers, hybrid vehicles, and electric vehicles. Among secondary batteries, a large amount of research has been conducted on lithium secondary batteries having high energy density and discharge voltage. Lithium secondary batteries have been manufactured as pouched-type battery cells having flexibility, prismatic battery cells having rigidity, or cylindrical can-type battery cells.

Typically, a plurality of battery cells are electrically connected to form a cell stack, and one or more cell stacks may be accommodated in a module housing to form a battery module. In addition, the plurality of battery modules may be accommodated in a pack housing to form a battery pack. The battery pack may then be installed and used in an electric vehicle or other applications.

A battery pack according to related art accommodates a plurality of battery modules. Accordingly, the battery pack is manufactured through a process of assembling a battery module and a process of assembling the battery module into a pack housing. The commercial manufacturing processes are rather complex and may have shortcomings including long manufacturing time periods required.

SUMMARY

An aspect of the present disclosure provides a battery pack that is easily manufactured and is capable of quickly cutting off overcurrent when the overcurrent occurs.

According to an aspect of the present disclosure, there is provided a battery pack including a pack housing, and at least one battery assembly accommodated in the pack housing. The battery assembly may include a first cell stack and a second cell stack in each of which a plurality of battery cells are stacked, and a busbar assembly electrically connecting the plurality of battery cells to each other. The busbar assembly may include a first coupling portion coupled to the first cell stack, a second coupling portion coupled to the second cell stack, and a connection portion connecting the first coupling portion and the second coupling portion to each other.

The busbar assembly may include multiple busbars disposed on the first coupling portion and the second coupling portion to be bonded to the plurality of battery cells, and a support plate to which the multiple busbars are fixedly fastened.

The busbar may further include a bridge busbar interconnecting a first busbar disposed on the first coupling portion and a second busbar disposed on the second coupling portion.

The bridge busbar may be integrally formed with the first busbar and the second busbar.

At least a portion of the bridge busbar may be embedded in the support plate.

The bridge busbar may include a breakable portion formed of a material different from that of the bus bar, and the breakable portion may be fused at a temperature lower than a melting point of the bus bar.

At least a portion of the breakable portion may be formed to have a cross-sectional area smaller than those of other portions of the bridge busbar.

The busbar may be formed of a copper material. The breakable portion may be formed of an aluminum material.

The breakable portion may be entirely embedded in the support plate.

The pack housing may include a partition wall member partitioning an inner space into multiple accommodating spaces. The first cell stack and the second cell stack may be disposed in different accommodating spaces, respectively.

The connection portion of the busbar assembly may include an insertion groove into which the partition wall member is inserted.

An inner space of the partition wall member may be used as a gas flow path through which high-temperature gas moves. The partition wall member may include a venting portion discharging the high-temperature gas toward the busbar assembly.

The bridge busbar may have at least one through-hole formed therein.

According to another aspect of the present disclosure, there is provided a battery pack including a pack housing including a partition wall member partitioning an inner space into multiple accommodating spaces, and at least one battery assembly accommodated in the accommodating spaces. The battery assembly may include a first cell stack and a second cell stack in which a plurality of battery cells are stacked, and a busbar assembly to which the first cell stack and the second cell stack are fixedly coupled. The partition wall member may be disposed to cross between the first cell stack and the second cell stack. The busbar assembly may include an insertion groove into which the partition wall member is inserted.

The busbar assembly may include a first busbar coupled to the first cell stack, a second busbar coupled to the second cell stack, a bridge busbar interconnecting the first busbar and the second busbar, and a support plate to which the first busbar, the second busbar, and the bridge busbar are fixedly fastened.

At least a portion of the bridge busbar may be embedded in the support plate.

The bridge busbar may include a breakable portion fused at a temperature lower than melting points of the first and second busbars.

An inner space of the partition wall member may be used as a gas flow path through which gas moves. A portion of the partition wall member opposing the busbar assembly may include a venting portion discharging the gas outside of the partition wall member.

According to example embodiments of the present disclosure, multiple cell stacks may be provided in a battery assembly. Accordingly, a process of coupling a connection member to electrically connect the respective cell stacks may be omitted, thereby facilitating a manufacturing process and minimizing a period of time required for manufacturing.

BRIEF DESCRIPTION OF DRAWINGS

The above and other aspects, features, and advantages of the present disclosure will be more clearly understood from following description, taken in the detailed conjunction with the accompanying drawings, in which.

DETAILED DESCRIPTION

Figure 1:
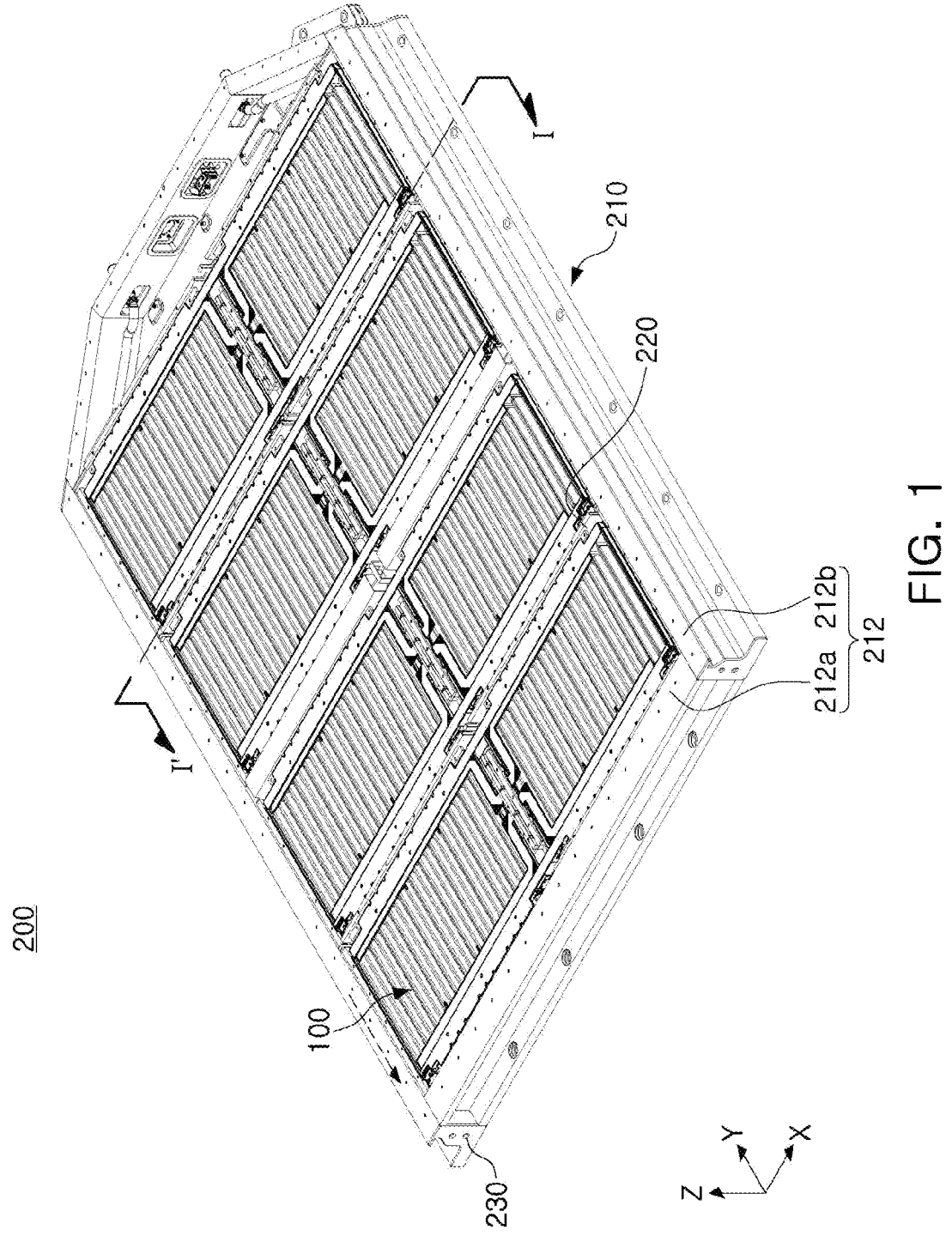
FIG. 1 is a perspective view of a battery pack according to an example embodiment of the present disclosure.

Hereinafter, preferred example embodiments of the present disclosure will be described in detail with reference to the accompanying drawings. In this case, it should be noted that the same components in the accompanying drawings are denoted by the same reference numerals as much as possible. In addition, detailed descriptions of well-known functions and configurations that may obscure the gist of the present disclosure may be omitted. For the same reason, some components are exaggerated, omitted, or schematically illustrated in the accompanying drawings, and the size of each component does not fully reflect the actual size.

In the present specification, an upper side, an upper portion, a lower side, a lower portion, and the like are described with reference to the drawings, and may be described differently when the direction of a corresponding object is changed.

In addition, a battery device described below may include an EV system, an energy storage system, and the like including a battery module or battery pack including a plurality of battery cells. In the following example embodiments, the battery pack will be described as an example.

Figure 2:
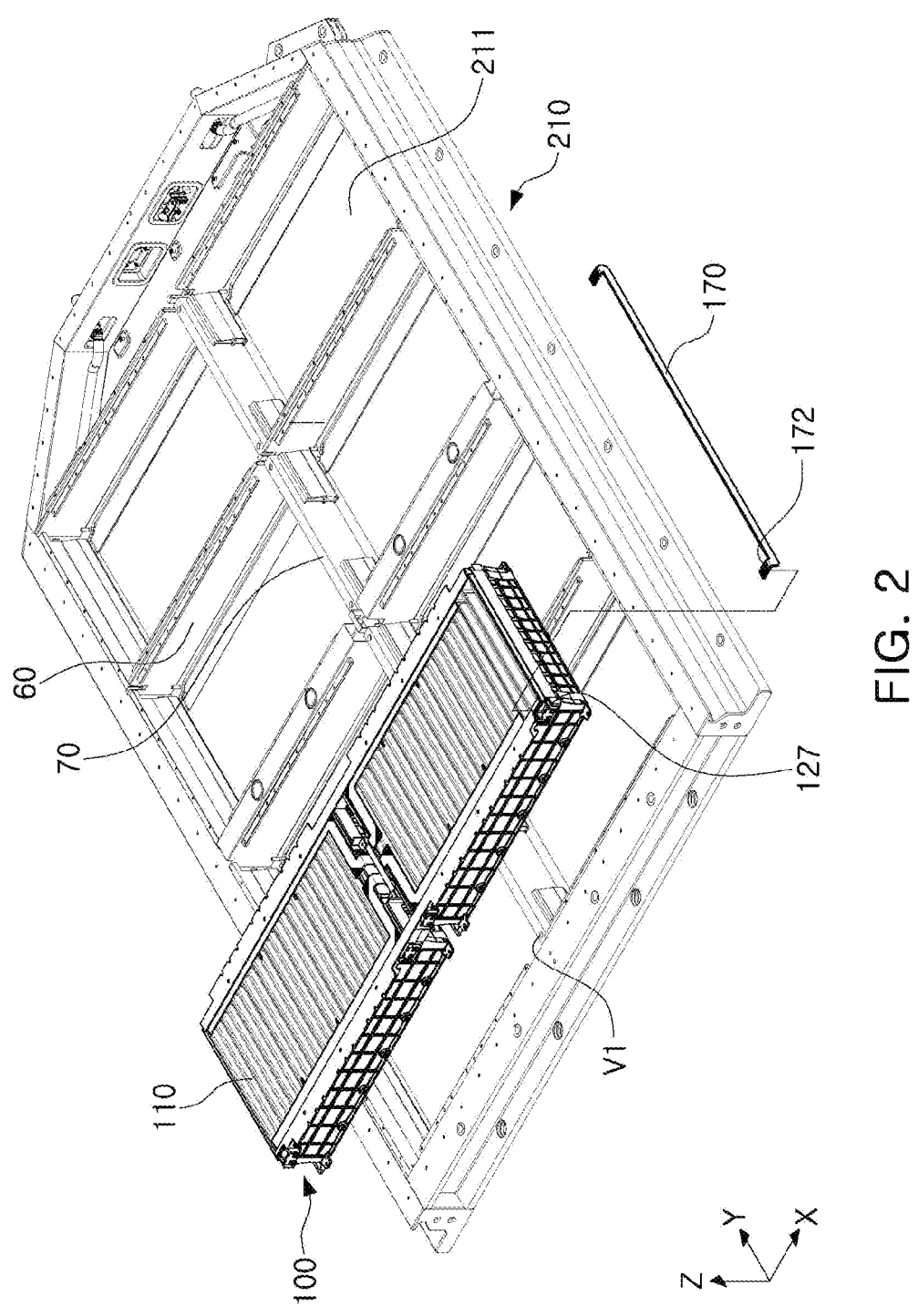
FIG. 2 is a partially exploded perspective view of FIG. 1.

FIG. 1 is a perspective view of a battery pack according to an example embodiment of the present disclosure. FIG. 2 is a partially exploded perspective view of FIG. 1. An upper cover forming an upper surface of the pack housing 210 is omitted in FIGS. 1 and 2 such that an internal structure of a battery pack 200 is easily identified.

Referring to FIGS. 1 and 2, the battery pack 200 may include a pack housing 210, a plurality of battery assemblies 100, and a connection member 170.

The pack housing 210 may accommodate the plurality of battery assemblies 100 and the connection member 170 therein. The pack housing 210 may include a sidewall structure 212 forming an inner space, and partition wall members 60 and 70 disposed in the inner space. In addition, the pack housing 210 may include a lower cover (also referred to as bottom cover) 211 covering a lower portion (also referred to as bottom) of the inner space and an upper cover (also referred to as top cover) covering an upper portion (also referred to as (top cover) of the inner space.

The sidewall structure 212 may include a first sidewall 212a positioned at each of opposite ends of the pack housing 210 in a first direction (for example, Y-axis direction) and a second sidewall 212b positioned at each of opposite ends of the pack housing 210 in a second direction (for example, X-axis direction), perpendicular to the first direction. The first sidewall 212a and the second sidewall 212b may be coupled to each other to form a frame for the pack housing 210 having four exterior surfaces.

The partition wall members 60 and 70 may be disposed to cross the inner space formed by the sidewall structure 212 and to partition the inner space into multiple accommodating spaces. Accordingly, at least a portion of the partition wall members 60 and 70 may be fastened to the sidewall structure 212.

The partition wall members 60 and 70 may also serve to reinforce the overall rigidity of the pack housing 210. The partition wall members 60 and 70 may also be disposed between cell stacks 110 to be described below to suppress propagation of gas or flame between the cell stacks 110.

Specifically, the partition wall members 60 and 70 may be disposed to cross between the two cell stacks 110 disposed to oppose each other.

Accordingly, the cell stacks 110 may be dispersedly disposed in the multiple accommodating spaces the inner space is partitioned by the sidewall structure 212 and the partition wall members 60 and 70.

The partition wall members 60 and 70 according to the present embodiment may include at least one first partition wall member 70 and at least one second partition wall member 60. The first partition wall member 70 and the second partition wall member 60 may be disposed to be perpendicular to each other.

In the illustrated example of FIG. 2, only one first partition wall 70 is formed inside the inner space of the battery pack housing 210 and the opposite ends of the first partition wall member 70 are fastened to the sidewall structure 212 dividing the inner space of the pack housing 210 into two spaces. However, the present disclosure is not limited thereto, and two or more first partition wall members 70 may be used in conjunction with one or more second partition wall members 60. For example, one or more opposite ends of the of the first wall partition member or members may be configured to be fastened to the second partition wall member or members 60 to be described below. Accordingly, multiple first partition wall members 70 and second partition wall members 60 may be additionally disposed in various positions.

The first partition wall member 70 may be disposed to cross the battery assemblies 100 to be described below.

The second partition wall member 60 may be disposed between the battery assemblies 100 to be described below, and thus may be disposed in parallel with the battery assemblies 100.

Accordingly, the battery assemblies 100 may be disposed to be spaced apart from each other inside multiple accommodating spaces partitioned by the sidewall structure 212 and the second partition wall members 60. In addition, the cell stacks 110 may be accommodated in minimum-unit accommodating spaces partitioned by the first partition wall member 70 and the second partition wall member 60, respectively.

Inner spaces of the first partition wall member 70 and the second partition wall member 60 may be used as a venting flow path through which gas discharged from a cell stack 110 moves.

A venting member 230 may be installed in the pack housing 210 to discharge gas, flame, and/or a combustion material generated from a battery cell 111 included in the cell stack 110 outside of the battery pack 200. The venting member 230 may have a structure that is normally closed, and is openable when gas is discharged. In addition, the venting member 230 may be provided in the pack housing 210 in the form of an open hole. Multiple venting members 230 may be employed. The installation position and the number of the venting members 230 may be changed in various manners, as necessary.

In addition, a venting flow path, a path through which gas, flame, and/or a combustion material moves to the one or multiple venting members 230, may be provided in the pack housing 210. For example, the venting flow path may be formed in the sidewall structure 212, in the partition wall members 60 and 70, or in a space between the pack housing 210 and the battery assemblies 100. Accordingly, the gas introduced into the venting flow path may be discharged outside of the battery pack 200 through the venting member 230 provided in the pack housing 210, thereby minimizing the rapid propagation of flame/heat and secondary damage resulting therefrom.

In addition, in the partition wall members 60 and 70 according to the present embodiment, a venting portion V1 may be provided in a region opposing a bridge busbar 125c to be described below.

At least a portion of the venting portion V1 may be disposed to oppose a bridge busbar 125c of a busbar assembly 120 to be described below. The position or size of the venting portion V1 is not limited, and may be defined to correspond to a position or width of the bridge busbar 20.

For example, as illustrated herein, the venting portion V1 may be disposed on an upper surface of the first partition wall member 70, and may be provided in the form of an open hole. However, the venting portion V1 may be configured in other forms such as, for example, the form of a valve or a membrane that open at or above a specific pressure and/or temperature.

For example, when high-temperature gas flows into the first partition wall member 70 due to an abnormal phenomenon in a battery cell, the high-temperature gas may be discharged outside of the first partition wall member 70 through the venting portion V1, and thus the gas may be discharged toward the bridge busbar 125c.

Multiple battery assemblies 100 may be accommodated in the pack housing 210. For example, the multiple battery assemblies 100 may be disposed in parallel in multiple rows arranged inside the accommodating space of the pack housing 210.

Figure 3:
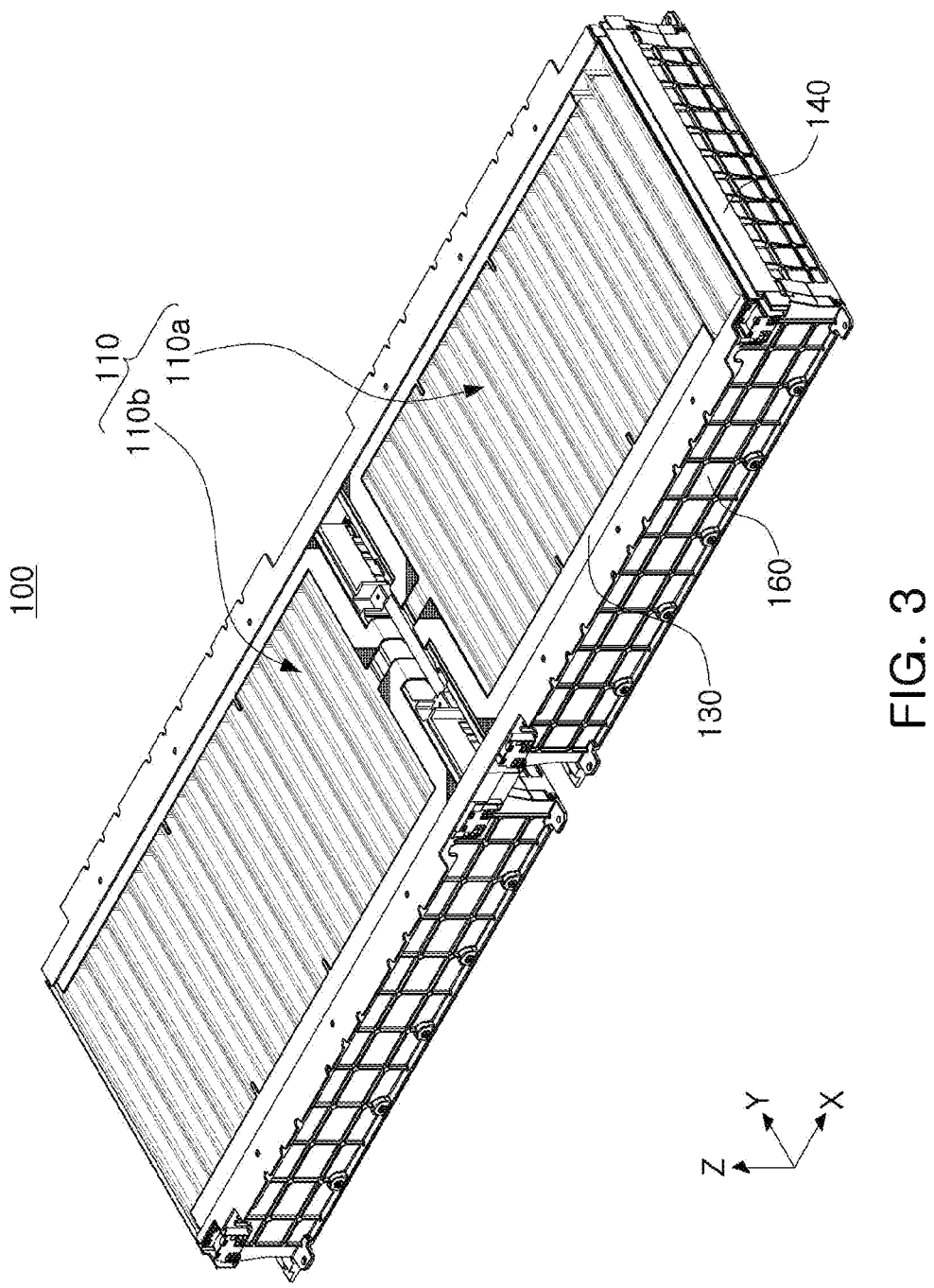
FIG. 3 is a perspective view of the battery assembly illustrated in FIG. 1.
Figure 4:
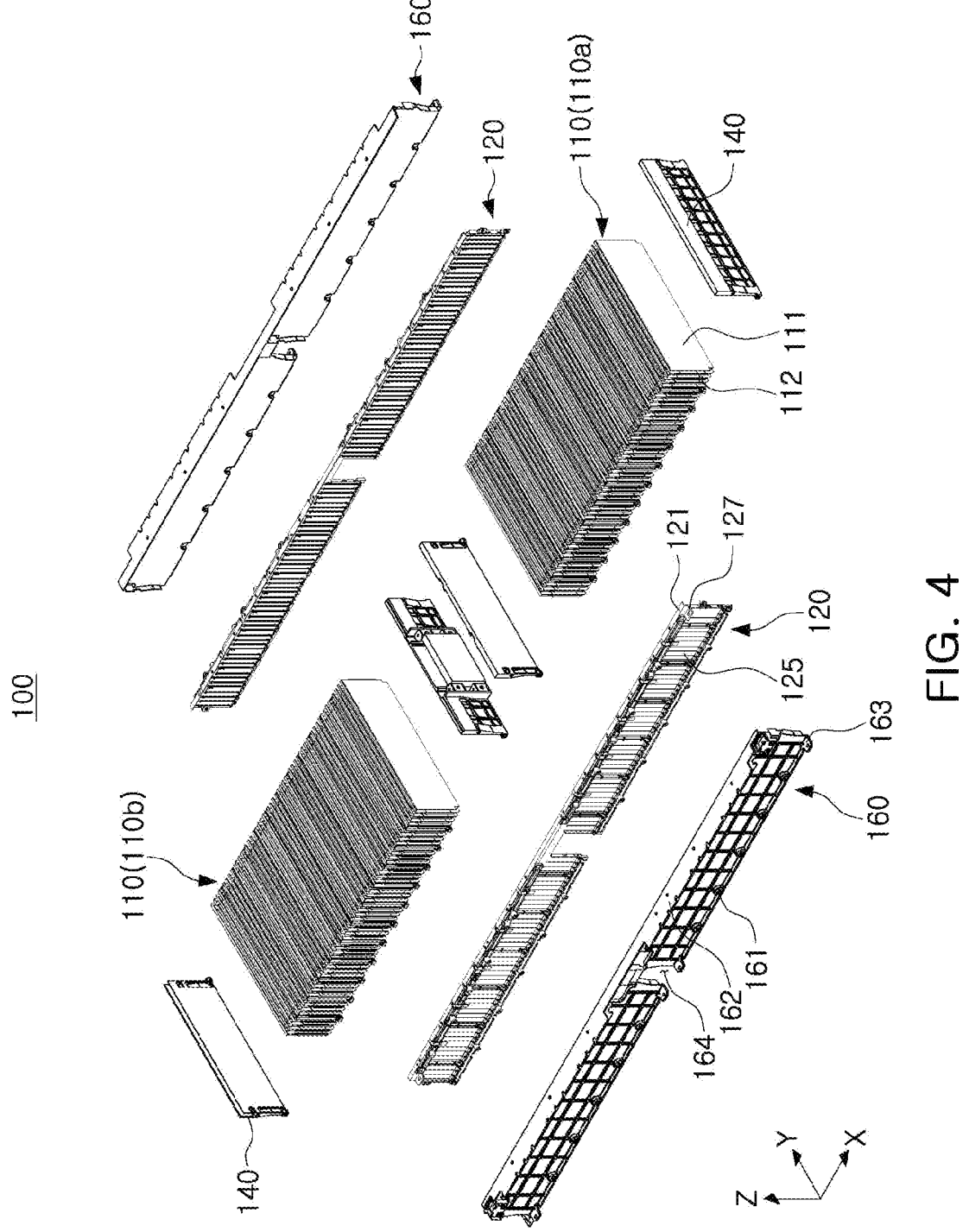
FIG. 4 is an exploded perspective view of FIG. 3.

FIG. 3 is a perspective view of the battery assembly illustrated in FIG. 1. FIG. 4 is an exploded perspective view of FIG. 3. Here, a sensing unit 130 is omitted for ease of description in FIG. 4.

Referring to FIGS. 3 and 4, the battery assembly 100 according to an example embodiment of the present disclosure may include the cell stack 110 in which a plurality of battery cells 111 are stacked, the busbar assembly 120 coupled to the cell stack 110, and a plate unit 140 configured to cover at least a portion of a side surface of the cell stack 110.

The cell stack 110 may include a plurality of stacked battery cells 111. The battery cells 111 may be stacked on each other in a thickness direction (X-axis direction) such that wider surfaces thereof are in contact with each other. In this case, the neighboring battery cells 111 may be fixed through an adhesive member such as a double-sided tape.

The battery cells 111 provided in the cell stack 110 may be formed of a pouched type secondary battery. The battery cells 111 formed of the pouch-type secondary battery may be configured in a form in which an electrode assembly and an electrolyte are accommodated in an exterior material (pouch). The electrode assembly may be configured in a form in which an anode plate and a cathode plate are stacked with a separator interposed therebetween in a state in which the wide surfaces of the anode plate and cathode plate oppose each other. An electrode tab may be connected to each of the anode plate and the cathode plate. An electrode tab having the same polarity may be connected to an electrode lead 112 to be exposed outside of the exterior material. The electrode lead 112 may be disposed on each of opposite ends in a longitudinal direction (Y-axis direction) of the battery cell 111. However, all of a plurality of electrode leads 112 may be disposed on one end of the battery cell 111.

The battery cells 111 may be formed, for example, of a nickel metal hydride (Ni-MH) battery or a lithium ion (Li-ion) battery capable of being charged and discharged. In the above, a case in which a pouch-type secondary battery is used as the battery cell 111 is described as an example. However, in an example embodiment of the present disclosure, the battery cell 111 provided in the battery assembly 100 is not limited to the pouch-type secondary battery, and may be configured as a can-type secondary battery or cylindrical secondary battery.

In the present embodiment, one battery assembly 100 may include at least two cell stacks 110a and 110b. For example, the cell stack 110 according to the present embodiment may include a first cell stack 110a and a second cell stack 110b.

As illustrated in FIG. 2, a first partition wall member 70 is disposed between the first cell stack 110a and the second cell stack 110b. Specifically, the first cell stack 110a and the second cell stack 110b may be disposed in different accommodating spaces divided by the partition wall members 60 and 70, respectively. Accordingly, even when thermal runaway occurs in a cell stack (for example, the first cell stack), it is possible to minimize the influence of gas, flames, and a combustion material on another cell stack (for example, the second cell stack).

The first cell stack 110a and the second cell stack 110b may be coupled to the busbar assembly 120 to form a single structure.

Figure 5:
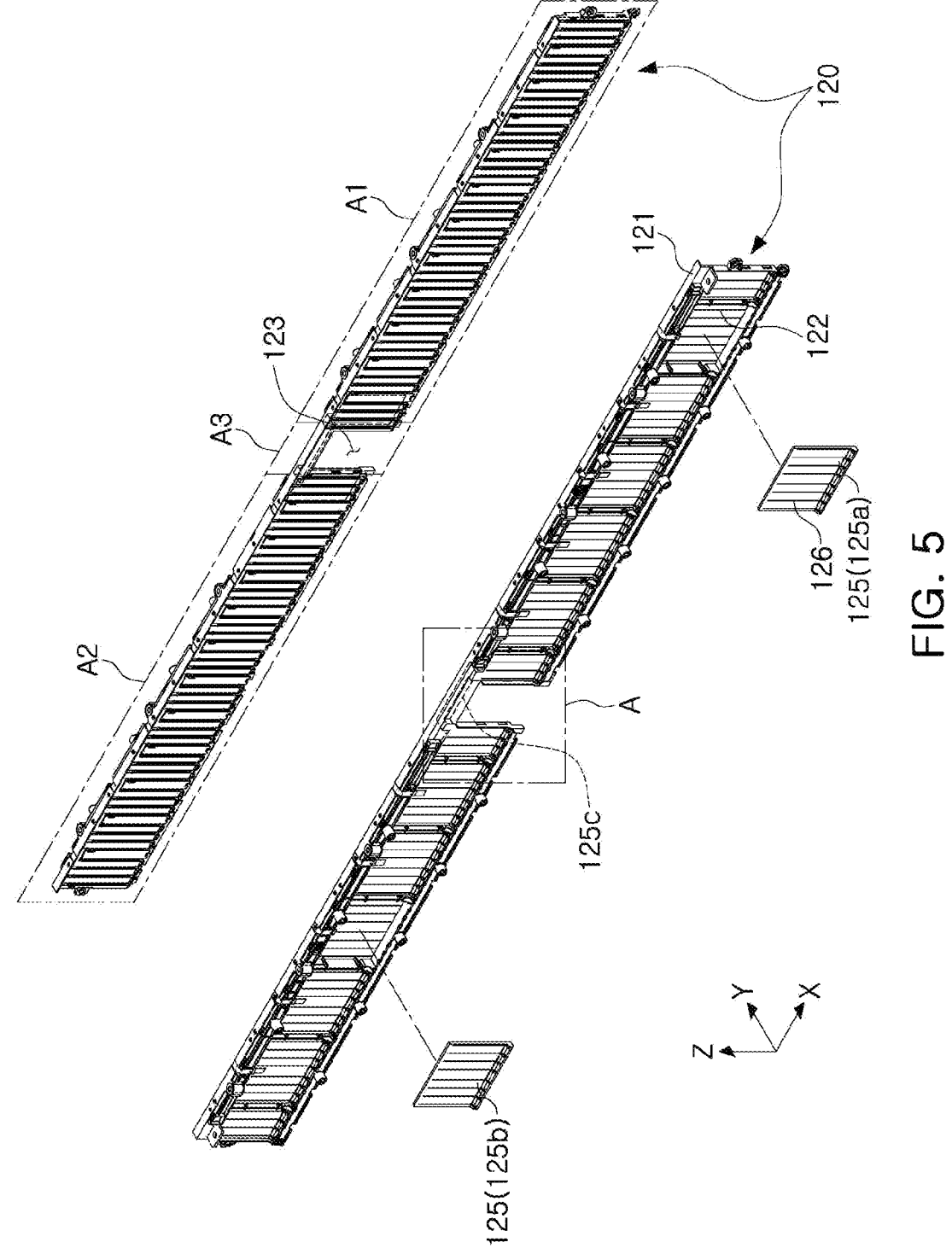
FIG. 5 is a partially exploded perspective view of the busbar assembly illustrated in FIG. 4.
Figure 6:
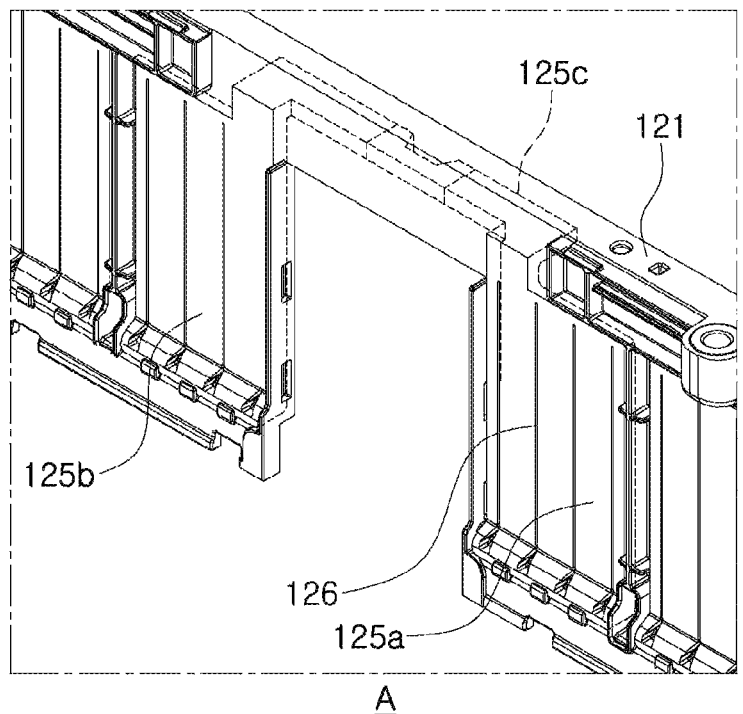
FIG. 6 is an enlarged view of portion A of FIG. 5.
Figure 7:
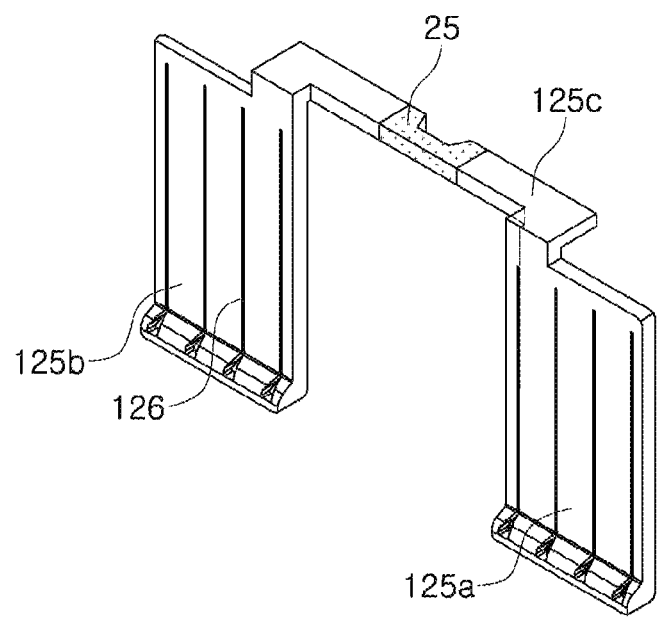
FIG. 7 is a perspective view illustrating the bridge busbar illustrated in FIG. 6.

FIG. 5 is a partially exploded perspective view of the busbar assembly illustrated in FIG. 4. FIG. 6 is an enlarged view of portion A of FIG. 5. FIG. 7 is a perspective view illustrating the bridge busbar illustrated in FIG. 6.

Referring now to FIGS. 5 to 7, the busbar assembly 120 may include multiple busbars 125 electrically/physically connected to the electrode leads 112 of the battery cells 111. The busbar 125 may be formed of an electrically conductive material to implement a series or parallel electrical connection structure of the battery cells 111.

The electrode leads 112 may be exposed outside of the busbar 125 through respective coupling holes 126 passing through the busbar 125. The electrode leads 112 may be welded to the busbar 125 in a state in which the electrode leads 112 pass through respective coupling holes 126.

When the electrode lead 112 of the battery cell 111 is disposed on opposite ends in a longitudinal direction (Y-axis direction) of the battery cell 111 as in the present embodiment, the busbar assembly 120 may be disposed on each of the opposite ends in the longitudinal direction (Y-axis direction) of the battery cell 111 to be coupled to the cell stack 110.

The busbar assembly 120 may include a support plate 121 having insulating properties to which the busbar 125 and the bridge busbar 125*c* to be described below are fixedly fastened. At least a portion of the support plate 121 may be positioned between the busbar 125 and the battery cell 111 for insulation between the busbar 125 and the battery cell 111. The support plate 121 may have a through-hole 122 allowing the electrode lead 112 to pass therethrough. Accordingly, the electrode lead 112 may be coupled to the coupling hole 126 of the busbar 125 in a state in which the electrode lead 112 passes through the through-hole 122 of the support plate 121.

The busbar 125 may be disposed on a surface of the support plate 121. In this case, the other surface of the support plate 121 may be a surface opposing the battery cells 111. The busbar 125 may be bonded to the surface of the support plate 121 or may be fastened to one surface of the support plate 121 through a fastening member. For example, the busbar 125 may be integrally formed with the support plate 121 through an insert injection process.

The busbar 125 may be connected to a connection terminal 127. The connection terminal 127 may be provided to electrically connect the busbar assembly 100 to an external element or another busbar assembly 100. Accordingly, the connection terminal 127 may be exposed outside of the busbar assembly 100. The connection terminal 127 may be integrally formed with the busbar 125, but the present disclosure is not limited thereto. Various modifications may be made, such as being separately provided and electrically connected to the busbar 125.

In order for the first cell stack 110*a* and the second cell stack 110*b* to be coupled into a single structure through the busbar assembly 120, the busbar assembly 120 according to the present embodiment may be divided into a first coupling portion A1, a second coupling portion A2, and a connection portion A3.

The first coupling portion A1 may refer to a portion of the busbar assembly 120 coupled to the first cell stack 110*a*. In addition, the second coupling portion A2 may refer to a portion of the busbar assembly 120 coupled to the second cell stack 110*b*. Accordingly, both the first coupling portion A1 and the second coupling portion A2 may include the multiple busbars 125 and the support plate 121 supporting the multiple busbars 125.

The connection portion A3 may refer to a portion interconnecting the first coupling portion A1 and the second coupling portion A2 of the busbar assembly 120. Accordingly, the connection portion A3 may include a portion of the busbar assembly 120 positioned between the first coupling portion A1 and the second coupling portion A2.

As described above, the first partition wall member 70 may be disposed to cross between the first cell stack 110*a* and the second cell stack 110*b*. Accordingly, an insertion groove 123 into which the first partition wall member 70 is inserted may be formed in the connection portion A3. The insertion groove 123 may be formed to have a shape corresponding to a height or width of the first partition wall member 70.

In addition, in the busbar assembly 120 according to the present embodiment, the bridge busbar 125*c* may be provided.

The bridge busbar 125*c* may be a busbar electrically connecting the busbar 125 of the first coupling portion A1 and the busbar 125 of the second coupling portion A2 to each other.

The bridge busbar 125*c* may be disposed on the connection portion A3, and may be connected to each of a busbar (hereinafter, the first busbar, 125*a*) disposed on the first coupling portion A1 and a busbar (hereinafter, the second busbar 125*b*) disposed on the second coupling portion A2.

In the present embodiment, the first coupling portion A1 or the second coupling portion A2 may include the multiple busbars 125. Accordingly, the bridge busbar 125*c* may be integrally formed with the first busbar 125*a* and the second busbar 125*b* disposed closest to the bridge busbar 125*c* among the multiple busbars 125.

However, the present disclosure is not limited thereto. For example, various modifications may be made, such as configuring the entire busbar included in the first coupling portion A1 and the second coupling portion A2 to be integrally formed with the bridge busbar 125*c*.

Through such a configuration, in the battery assembly 100 according to the present embodiment, the first cell stack 110*a* and the second cell stack 110*b* may be electrically connected to each other only through a process of coupling the cell stacks 110*a* and 110*b* and the busbar assembly 120 to each other. Accordingly, in order to electrically connect the first cell stack 110*a* and the second cell stack 110*b* to each other, a connection member may not need to be fastened to the first cell stack 110*a* and the second cell stack 110*b*, thereby facilitating a manufacturing process and minimizing a period of time required for manufacturing.

In addition, the bridge busbar 125*c* according to the present embodiment may include a breakable portion 25.

The breakable portion 25 may be formed of a material different from those of other portions of the bridge busbar 125*c*. For example, in the present embodiment, the busbar 125 or the bridge busbar 125*c* may be generally formed of a copper material, and the breakable portion 25 of the bridge busbar 125*c* may be formed of an aluminum material. However, the material of the breakable portion 25 is not limited thereto.

The breakable portion 25 may be inserted and disposed in the middle of the bridge busbar 125*c*, and may melt at a temperature lower than those of the other portions. For example, the breakable portion 25 according to the present embodiment may be fused at a temperature lower than a melting point of the busbar 125.

In addition, the breakable portion 25 may have a cross-sectional area smaller than those of the other portions of the bridge busbar 125*c*. That is, at least a portion of the breakable portion 25 may be formed to have a width narrower than those of the other portions of the bridge busbar 125*c* or a thickness less than those of the other portions of the bridge busbar 125*c*. In this case, when overcurrent flows through the bridge busbar 125*c*, the breakable portion 25 may have greatly increased resistance, as compared to the other portions, such that the breakable portion 25 may be fused more quickly than the other portions due to Joule's heat generated. Accordingly, when overcurrent such as short-circuit current flows through the busbar assembly 120, the overcurrent may be quickly cut off.

In the bridge busbar 125*c* according to the present embodiment, the breakable portion 25 may have a notch-shaped groove, and thus may have a cross-sectional area smaller than those of the other portions. However, the present disclosure is not limited thereto, and various modifications may be made.

Figure 9:
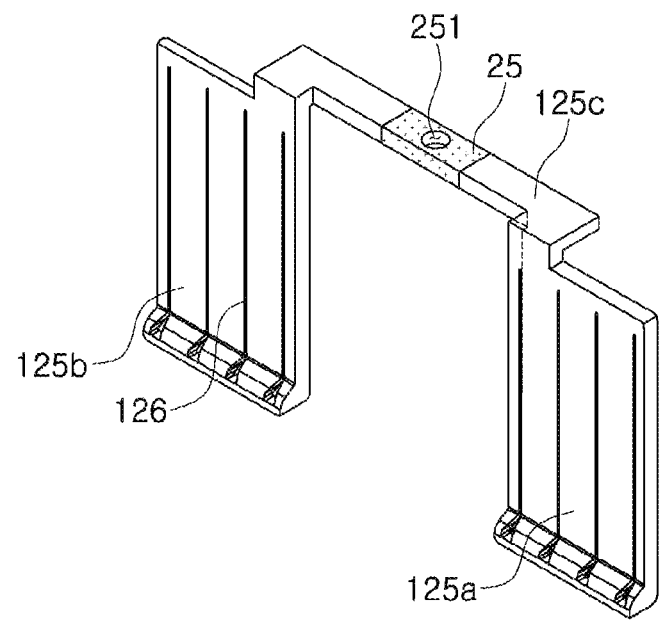
FIG. 9 is a perspective view illustrating a bridge busbar according to another example embodiment of the present disclosure.

FIG. 9 is a perspective view illustrating a bridge busbar according to another example embodiment of the present disclosure. Referring to FIG. 9, in the bridge busbar 125*c* according to the present embodiment, at least one through-hole 251 may be formed in the breakable portion 25. Accordingly, the breakable portion 25 may be formed to have a cross-sectional area smaller than those of the other portions.

Thus, the shape of the breakable portion 25 of the present disclosure is not limited, and may be deformed into various shapes as long as a cross-sectional area thereof is formed to be smaller than those of other portions. For example, the breakable portion 25 may have an empty space therein, or may be formed of a porous material.

In addition, at least a portion of the bridge busbar 125*c* according to the present embodiment may be embedded in the support plate 121.

When the bridge busbar 125*c* is disposed outside the support plate 121, the bridge busbar 125*c* may be in contact with other elements of the battery pack 200 (for example, a pack housing). In this case, even when a surface of the bridge busbar 125*c* is insulation-coated, the insulation coating may be peeled off due to repeated contact, which may an issue as cause such a short circuit.

Accordingly, in the present embodiment, the entire bridge busbar 125*c* may be disposed in the support plate 121.

However, the present disclosure is not limited thereto. For example, it is also possible to configure only the breakable portion 25 of the bridge busbar 125*c* to be embedded in the support plate 121. When the breakable portion 25 is exposed outside of the support plate 121, fragments of the breakable portion 25 melting in the process of the breakable portion 25 being fused may be scattered in all directions, and the fragments may be seated on other members to act as a factor to break the insulation of the battery pack 200.

Accordingly, in order to resolve the above-described issue, in the bridge busbar 125*c* according to the present embodiment, the entire breakable portion 25 may be embedded in the support plate 121.

The embedding of the bridge busbar 125*c* may be implemented through an insert injection process, but the present disclosure is not limited thereto.

Figure 8:
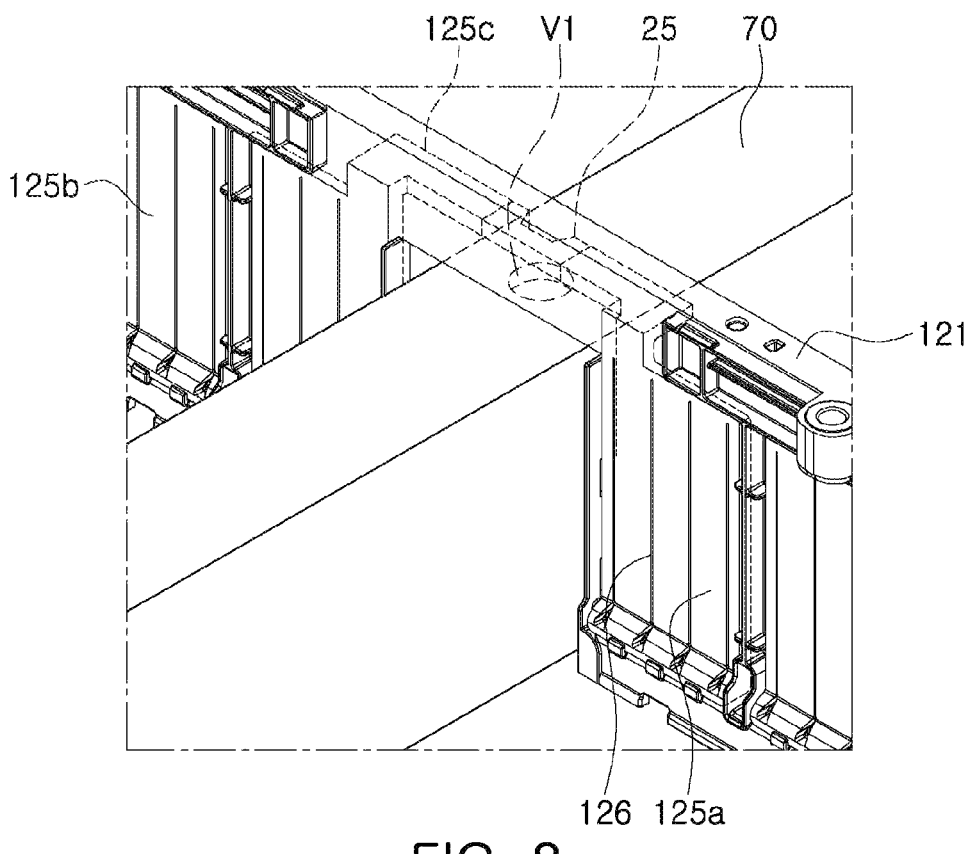
FIG. 8 is a perspective view illustrating a state in which a partition wall member is inserted into an insertion groove of the bridge busbar illustrated in FIG. 6.

FIG. 8 is a perspective view illustrating a state in which a partition wall member is inserted into an insertion groove of the bridge busbar illustrated in FIG. 6.

Referring to FIG. 8, the bridge busbar 125*c* according to the present embodiment may be disposed such that the breakable portion 25 opposes the above-described venting portion V1. Specifically, the bridge busbar 125*c* may be disposed such that at least a portion of the breakable portion 25 opposes the venting portion V1 provided in the first partition wall member 70.

Accordingly, the support plate 121 is covering the breakable portion 25 and the breakable portion 25 may sequentially melt due to high-temperature and high-pressure gas discharged from the venting portion V1, and thus electrical insulation between the cell stacks 110*a* and 110*b* may be cut off.

Accordingly, even when an issue occurs in a specific cell stack 110*a*, a short-circuit current may be prevented from flowing into the other cell stacks 110*b*, thereby preventing secondary explosion or thermal runaway from spreading.

In order for the breakable portion 25 to be fused quickly, a portion of the support plate 121 covering the breakable portion 25 may need to be easily removed by the high-temperature gas discharged from the venting portion V1. Accordingly, the portion of the support plate 121 covering the breakable portion 25 according to the present embodiment may be formed of a material that melts to be removable at a temperature of 200° C. or lower. However, the present disclosure is not limited thereto. Various modifications may be made, such as configuring the breakable portion 25 to be exposed outside of the support plate 121 without forming the support plate 121 between the breaking portion 25 and the venting portion V1 such that the breakable portion 25 directly opposes the venting portion V1.

The plate unit 140 may be configured to cover at least a portion of side surfaces of the cell stack 110 to protect the side surfaces of the cell stack 110 from the outside. The plate unit 140 may be coupled to at least one of the side surfaces of the cell stack 110. Accordingly, the busbar assembly 100 may have a shape in which at least a portion of an upper surface and a at least a portion of a lower surface of the cell stack 110 are exposed outside.

As an example, the plate unit 140 may cover the cell stack 110 in a stacking direction (X-axis direction) of the battery cell 111, and two plate units 140 may be respectively coupled to opposite side surfaces on which the . . . bar assembly 120 is not disposed among four side surfaces of the cell stack 110. Accordingly, the two plate units 140 may be disposed in parallel with the battery cell 111.

Accordingly, the battery assembly 100 according to the present embodiment may have a structure in which two side surfaces of the battery cell 111 in the stacking direction (X-axis direction) are covered by the plate unit 140, and, two side surfaces of the battery cell 111 in a longitudinal direction (Y-axis direction) are covered by the busbar assembly 120, among the four side surfaces of the cell stack 110. That is, in the present embodiment, the four side surfaces of the cell stack 110 may be configured to be surrounded and protected by the plate unit 140 and the busbar assembly 120.

In addition, in the present embodiment, the battery assembly 100 may further include a bracket member 160 coupled to an exterior surface of the plate unit 140, and the battery assembly 100 may be fixedly installed in a pack housing (210 in FIG. 4) through the bracket member 160.

The bracket member 160 may be installed to correspond to all side surfaces of the cell stack 110, but may be installed in a portion of the cell stack 110 to minimize a volume of the battery assembly 100 and improve ease of assembly. As an example, the bracket member 160 may be coupled to an exterior surface of the busbar assembly 120 corresponding to a longer side of the battery assembly 100.

The bracket member 160 may be directly fastened to the busbar assembly 120 through a fastening member such as a bolt.

The bracket member 160 may include a support plate 161 having a wider surface opposing the busbar assembly 120, and an upper flange portion 162 provided at an upper end of the support plate 161. In addition, the bracket member 160 may include a lower flange portion 163 provided at a lower end of the support plate 161.

The bracket member 160 may reinforce rigidity of the battery assembly 100. To this end, the bracket member 160 may be formed of a metal material. However, the present disclosure is not limited thereto, and various materials may be used within a range having rigidity similar to that of a metal. In addition, in the battery assembly 100, the bracket member 160 may be fastened to the pack housing 210. For example, as the upper flange portion 162 and the lower flange portion 163 of the bracket member 160 are fastened to the pack housing 210, the battery assembly 100 may be fixedly coupled to the pack housing 210. To this end, the bracket member 160 may have rigidity capable of fixing the battery assembly 100 to the pack housing 210.

In addition, as described above, the first partition wall member 70 may be disposed to cross the first cell stack 110*a* and the second cell stack 110*b*, and thus the bracket member 160 may also have an insertion groove 164 into which the first partition wall member 70 is inserted.

In addition, the busbar assembly 120 according to the present embodiment may include the sensing unit 130. The sensing unit 130 may be provided to measure voltage or temperature of the battery cell 111. For example, the sensing unit 130 may include a voltage sensor connected to the busbar 125 and a temperature sensor installed on an outer surface (for example, upper surface) of the battery cell 111 to measure the temperature of the battery cell 111. In addition, the sensing unit 130 may include a printed circuit board (PCB) to transmit a signal received from the voltage sensor, the temperature sensor, and the like.

A connection member (170 in FIG. 2) may electrically connect the battery assemblies 100 to each other.

The connection member 170 according to the present embodiment may electrically connect at least two battery assemblies 100 to each other. To this end, opposite ends of the connection member 170 may be fastened to different battery assemblies 100, respectively.

The connection member 170 may be provided in the form of a rod, and may be formed of a material having high electrical conductivity, such as copper. A terminal coupling portion 172 coupled to the connection terminal 127 of the battery assembly 100 may be formed at each of opposite ends of the connection member 170. The terminal coupling portion 172 may be coupled to the connection terminal 127 while being seated on an upper surface of the connection terminal 127. Thus, the terminal coupling portion 172 may have a size and shape corresponding to those of the upper surface of the connection terminal 127.

In the battery pack 200 according to the present embodiment configured as described above, at least two cell stacks 110*a* and 110*b* may be provided in one battery assembly 100. Accordingly, a process of coupling a connection member to electrically connect the first cell stack 110*a* and the second cell stack 110*b* to each other may be omitted, thereby facilitating a manufacturing process and minimizing a period of time required for manufacturing.

In addition, the bridge busbar 125*c* may include a breakable portion 25. When overcurrent such as short-circuit current flows through a busbar, the overcurrent may be quickly cut off. Even when overcurrent occurs in a specific cell stack 110 in one battery assembly 100, the overcurrent may be prevented from flowing into another cell stack 110.

In addition, a busbar bridge 125*c* may be cut even by high-temperature gas discharged from the venting portion V1, and thus electrical connection with another cell stack may be quickly cut off, thereby ensuring stability and reliability of a battery pack during thermal runaway.

While example embodiments have been shown and described above, it will be apparent to those skilled in the art that modifications and variations could be made without departing from the scope of the present disclosure as defined by the appended claims.

For example, in the above-described example embodiments, a case in which one busbar includes one breakable portion is described as an example, but it is also possible to configure one busbar to include multiple breakable portions.

For example, the above-described example embodiments may be implemented by deleting some components, as necessary. In addition, in the above-described example embodiments, a case in which one busbar includes one breakable portion is described as an example, but it is also possible to configure one busbar to include multiple breakable portions.

In addition, in the above-described embodiments, various modifications may be made, such as configuring three or more cell stacks to be coupled to one busbar assembly.

What is claimed is:

1. A battery pack comprising:
a pack housing including an inner space and a partition wall member partitioning the inner space into multiple accommodating spaces; and
at least one battery assembly accommodated in the pack housing,
wherein the partition wall member includes a venting portion,
wherein the battery assembly includes:
a first cell stack and a second cell stack in each of which a plurality of battery cells are stacked and are disposed in different accommodating spaces, respectively, and
a busbar assembly electrically connecting the plurality of battery cells to each other,
wherein the busbar assembly includes:
a first coupling portion coupled to the first cell stack,
a second coupling portion coupled to the second cell stack, and
a connection portion connecting the first coupling portion and the second coupling portion to each other,
wherein the connection portion includes a breakable portion formed of a material different from that of the first coupling portion and the second coupling portion, and
wherein the breakable portion is disposed to oppose the venting portion, and is melted by high-temperature and high-pressure gas discharged from the venting portion or by an overcurrent, thereby cutting off an electrical connection between the first cell stack and the second cell stack.

2. The battery pack of claim 1, wherein the busbar assembly includes:
multiple busbars disposed on the first coupling portion and the second coupling portion to be bonded to the plurality of battery cells; and
a support plate to which the multiple busbars are fixedly fastened.

3. The battery pack of claim 2, wherein the multiple busbars further includes a bridge busbar interconnecting a first busbar disposed on the first coupling portion and a second busbar disposed on the second coupling portion.

4. The battery pack of claim 3, wherein the bridge busbar is integrally formed with the first busbar and the second busbar.

5. The battery pack of claim 3, wherein at least a portion of the bridge busbar is embedded in the support plate.

6. The battery pack of claim 3, wherein the bridge busbar includes the breakable portion formed of a material different from that of the multiple busbars, and the breakable portion is fused at a temperature lower than a melting point of the multiple busbars.

7. The battery pack of claim 6, wherein at least a portion of the breakable portion is formed to have a cross-sectional area smaller than those of other portions of the bridge busbar.

8. The battery pack of claim 6, wherein
the multiple busbars are formed of a copper material, and
the breakable portion is formed of an aluminum material.

9. The battery pack of claim 6, wherein the breakable portion is entirely embedded in the support plate.

10. The battery pack of claim 3, wherein the bridge busbar has at least one through-hole formed therein.

11. The battery pack of claim 1, wherein the connection portion of the busbar assembly includes an insertion groove into which the partition wall member is inserted.

12. The battery pack of claim 1, wherein an inner space of the partition wall member is used as a gas flow path through which gas moves, and the venting portion discharges the gas toward the venting portion.

13. A battery pack comprising:

a pack housing including a partition wall member partitioning an inner space into multiple accommodating spaces; and at least one battery assembly accommodated in the accommodating spaces, wherein the battery assembly includes:

a first cell stack and a second cell stack in which a plurality of battery cells are stacked and are disposed in different accommodating spaces, respectively, and a busbar assembly to which the first cell stack and the second cell stack are fixedly coupled, wherein the partition wall member includes a venting portion, and is disposed to cross between the first cell stack and the second cell stack, and wherein the busbar assembly includes a bridge busbar including a breakable portion and an insertion groove into which the partition wall member is inserted, wherein the breakable portion is disposed to oppose the venting portion, and is melted by high-temperature and high-pressure gas discharged from the venting portion, thereby cutting off electrical insulation between the first cell stack and the second cell stack.

14. The battery pack of claim 13, wherein the busbar assembly includes:

a first busbar coupled to the first cell stack, and a second busbar coupled to the second cell stack, wherein the bridge busbar interconnects the first busbar and the second busbar, and a support plate to which the first busbar, the second busbar, and the bridge busbar are fixedly fastened.

15. The battery pack of claim 14, wherein at least a portion of the bridge busbar is embedded in the support plate.

16. The battery pack of claim 14, wherein the breakable portion melts at a temperature lower than melting points of the first and second busbars.

17. The battery pack of claim 13, wherein an inner space of the partition wall member is used as a gas flow path through which gas moves, and wherein the venting portion is provided to discharge the gas outside of the partition wall member.

\* \* \* \* \*